United States Patent [19]
Jestice et al.

[11] Patent Number: 5,291,488
[45] Date of Patent: Mar. 1, 1994

[54] COMMUNICATION SYSTEM CONFIGURATION DATA MANAGEMENT

[75] Inventors: Calvin V. Jestice, Hoffman Estates; James M. Connor, Carol Stream; Jeffrey Lohrbach, Elgin; Daniel B. Sommers, Clarendon Hills, all of Ill.

[73] Assignee: Motorola, Inc., Schaumburg, Ill.

[21] Appl. No.: 684,620

[22] Filed: Apr. 12, 1991

Related U.S. Application Data

[63] Continuation-in-part of Ser. No. 509,915, Apr. 16, 1990, Pat. No. 5,175,727.

[51] Int. Cl.⁵ .......................................... H04L 12/40
[52] U.S. Cl. ................................. 370/85.1; 370/110.1
[58] Field of Search ............... 370/85.1, 85.13, 94.3, 370/110.1, 124, 58.1, 58.2, 58.3; 379/165, 53, 106, 107, 266; 340/825.03, 825.15, 825.17, 825.27

[56] References Cited

U.S. PATENT DOCUMENTS

| | | | |
|---|---|---|---|
| 4,677,611 | 6/1987 | Yanosy, Jr. et al. | 370/85.13 |
| 5,008,879 | 4/1991 | Fischer et al. | 370/85.1 |
| 5,051,982 | 9/1991 | Brown et al. | 370/110.1 |
| 5,144,621 | 9/1992 | Kinashi et al. | 370/85.1 |
| 5,175,727 | 12/1992 | Maher et al. | 370/58.1 |

Primary Examiner—Douglas W. Olms
Assistant Examiner—Hassan Kizou
Attorney, Agent, or Firm—Steven G. Parmelee

[57] ABSTRACT

System configuration data required for use by various interfaces (102) can be obtained either directly via a data link (104) that couples the interfaces to other systems (109 or 111), or by a down link from a system data manager (106) configured as part of the interfaces' system (100).

19 Claims, 3 Drawing Sheets

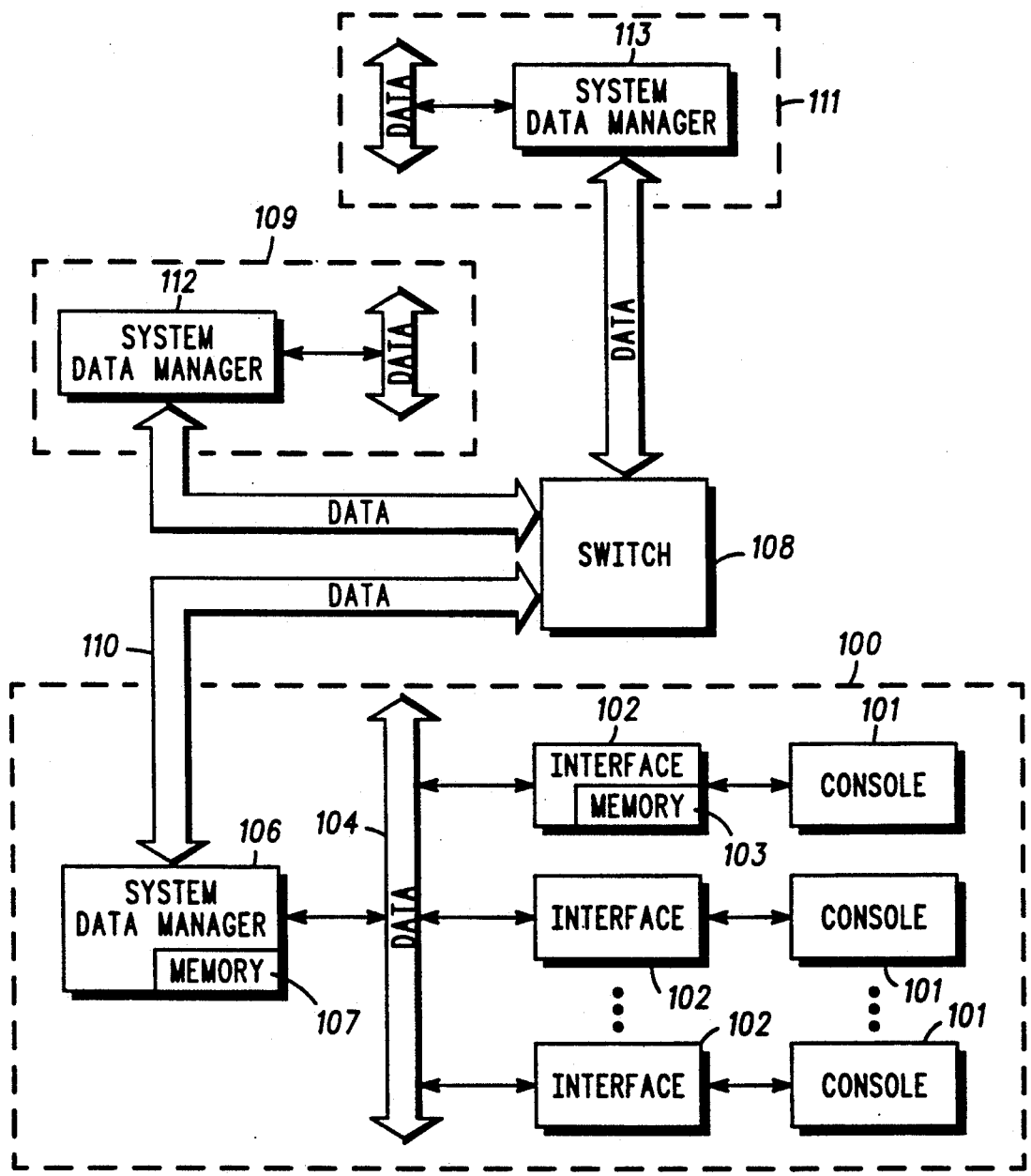

COMMUNICATION SYSTEM CONFIGURATION DATA MANAGEMENT

This application is a continuation-in-part of co-pending application Ser. No. 07/509,915, entitled "A Communication System Network" and filed on Apr. 16, 1990, now U.S. Pat. No. 5,175,727.

FIELD OF THE INVENTION

This invention relates generally to communication systems, including but not limited to data transmission and data management within a communication system.

BACKGROUND OF THE INVENTION

Communication systems are growing increasingly larger and more sophisticated. This growth includes a significant increase in the number of audio sources and destinations supported by a single communication system. Devices within the system that control or define such audio paths require access to a significant amount of system configuration data in order to facilitate timely, accurate, and efficient coupling of sources to destinations. To date this need has been readily accommodated by providing all such devices with a memory that includes all system configuration data for the system.

Now, however, as overall systems grow yet more complex and capable, a plurality of communication systems as characterized above may be combined as described in U.S. patent Ser. No. 07/509,915, entitled "A Communication System Network" and filed on Apr. 16, 1990, the contents of which are incorporated herein by this reference. By combining such systems, the number of audio sources and destinations significantly increases. This increase thereby further increases the problem of ensuring that devices within a particular system that require such information have ready access to the appropriate system configuration data.

One solution might be to follow the prior art approach, and simply provide each such device with a larger memory capable of retaining system configuration data for each system within the network. There are at least two problems with this approach. First, the provision of additional memory represents a significant cost, and raises other related difficulties as well. Second, intersystem data throughput would be significantly impacted if every device were free to independently communicate with all other devices at all times in order to assure that its stored system configuration data was current and complete.

Accordingly, a need exists for a method and apparatus that will substantially ensure that adequate system configuration data is provided to devices that require it, without presenting excess requirements for memory and without presenting an undue burden to data throughput capabilities.

SUMMARY OF THE INVENTION

These needs and others are substantially met through provision of the communication system configuration data management apparatus and method disclosed herein. Pursuant to this invention, a plurality of audio source and destination consoles are coupled through a data communication link to a plurality of interfaces. The interfaces each include a memory for storing system configuration data regarding its immediate communication system, and also for storing data content indicator information for other communication systems. The invention also provides for a system data manager that also couples to the data communication link, and that stores system configuration data for the immediate system as well as data content indicators for other communication systems. In addition, the system data manager can further determine a data content indicator for the immediate communication system.

So configured, the system data manager can act to exchange data content indicators with other communication systems to ascertain whether any of the systems lack current system configuration data. When such information requires updating, the system data manager lacking the current information will receive the updated system configuration data from the relevant system, and thereafter provide that information to the various interfaces within its own system. In one embodiment, those interfaces can then select relevant data and store that data within its own associated memory.

So configured, the system data manager assumes the task of interfacing in general with other communication systems to provide for general maintenance and upkeep of system configuration data, thereby minimizing data throughput requirements on intersystem data links.

In another embodiment, the interfaces are provided with the capability of updating their system configuration data by directly contacting other communication systems. Given the services provided by the system data manager, a need for direct contact will typically not occur frequently, and hence an acceptable balance can be drawn between assuring that necessary information can be obtained while simultaneously assuring that intersystem data links will not be continuously burdened with inquiries of this sort.

BRIEF DESCRIPTION OF THE DRAWINGS

FIG. 1 comprises a block diagram depiction of a plurality of communication systems configured in accordance with the invention;

DESCRIPTION OF A PREFERRED EMBODIMENT

Figure 2A:
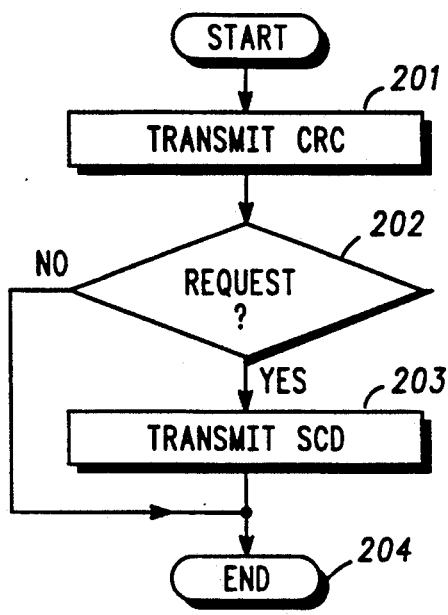
FIGS. 2A and B comprise flow diagrams depicting various operating modes of the system data manager in accordance with the invention.

The relevant portions of a typical communication system (100) in accordance with the invention can be seen in FIG. 1. (Other components of such a system, which are not relevant to the immediate discussion, are not presented for the sake of clarity. For information regarding such other components, the reader is referred to the previously mentioned patent application entitled "A Communication System Network.") The communication system (100) includes a plurality of consoles (101) that serve as both audio sources and destinations. These consoles may be, for example, Centracom Series II consoles as sold by Motorola, Inc. The consoles (101) each couple to an interface (102), which interfaces each include a memory (103). Each interface (102) includes appropriate data and audio path capabilities to support the interfacing needs of the associated console (101), which needs include both reception and transmission of audio and data signals. Such interfaces (102) may be provided through provision of, for example, operator MUX interfaces or trunked operator MUX interfaces, both as sold by Motorola, Inc. The above include processing capabilities, and are therefore programmable to operate in accordance with the description provided below.

The interfaces (102) each couple to an intrasystem data link (104) and to an intersystem data link (110) as described below in more detail.

Finally, the communication system (100) includes a system data manager (106) having a memory (107). The system data manager (106) couples to both data links (104 and 110), and therefore can communicate to any of the interfaces (102) within the system (100) or to the components of other communication systems.

To support the needs of this embodiment, the system data manager (106) comprises a processing platform having the appropriate communication interfacing capability.

The communication system (100) couples via the intersystem data link (110) to other communication systems (for example, those depicted by reference numerals 109 and 111), typically through one or more switches (108). In this embodiment, it will be presumed that each of the other communication systems (109 and 111) includes at least a system data manager (112 and 113) substantially identical to the one noted above. (Other elements, such as consoles and interfaces, would also likely be present, but are not shown to enhance clarity.)

Each of the interfaces (102) has stored within its associated memory (103) system configuration data regarding the immediate communication system (100), and also data content indicators for other communication systems (such as 109 and 111). The data content indicators may be, for example, cyclic redundancy checks based upon the system configuration data for any given system (various means for determining a cyclic redundancy check are well understood in the art, and hence will not be presented here). In addition, each interface (102) can store selected items of system configuration data for systems other than its own system. In this context, relevancy is determined primarily by a current or anticipated need for particular elements of system configuration data that are pertinent to the establishment and/or maintenance of a particular communication path. In this regard, system configuration data includes both audio source and audio destination information which an interface uses in order to establish a particular path in accordance with the needs of a particular application.

So configured, the system data manager (106) is programmed to operate as depicted in FIGS. 2A and B. Beginning with FIG. 2A, the system data manager (106) will, from time to time, transmit the data content indicator for its system (201), in this case the CRC noted above. (The system data manager (106) may be caused to transmit the CRC (201) in response to a variety of predetermined events, including time of day, elapsed time since a last transmission of like nature, in response to reception of a similar transmission from another system, or any other appropriate stimuli or indicia of condition.)

Following transmission of the CRC (201), a request for system configuration data may or may not then be subsequently received (202). In the absence of such a request, this process concludes (204). Upon receiving such a request, however, the system data manager (106) transmits the system configuration data (203) for its system as retained in its memory (107).

Figure 2B:
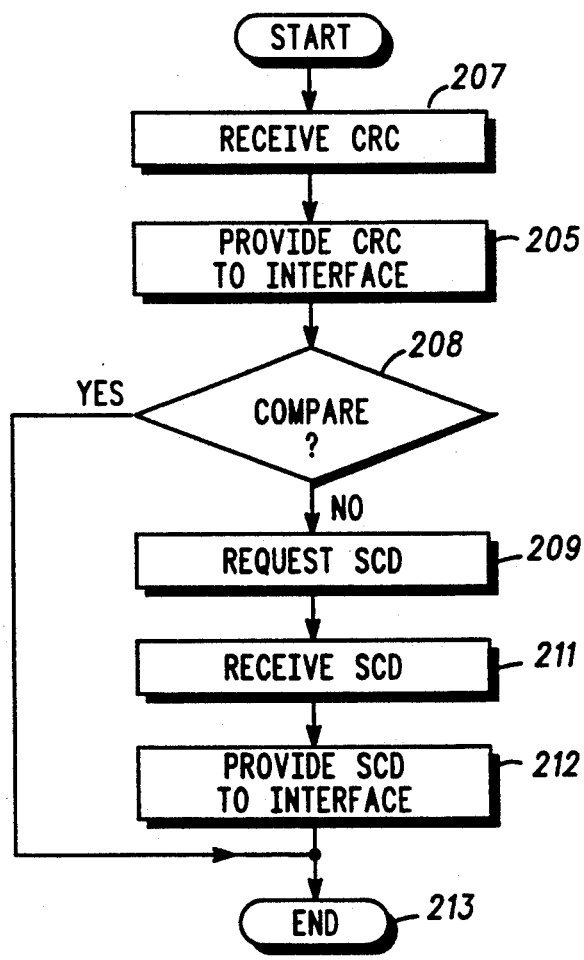

In addition to occasionally transmitting CRCs as described above, a system data manager (106) may occasionally receive a CRC (207) from a system data manager for another system as suggested in FIG. 2B. Upon receiving a CRC for another communication system, the system data manager (106) provides the received CRC to its associated interface (205) and also compares the received data content indicator against a corresponding and previously stored data content indicator for that same system. If the two are identical, the process concludes (213).

When the two indicators are different, thereby indicating that the current system configuration data for the other system now differs in some way from the previously received system configuration data, the system data manager (106) transmits a request for the other system's system configuration data (209). The system data manager (106) receives this data (211), and provides the system configuration data (212) to the interfaces (102).

In this embodiment, the system data manager (106) does not retain the system configuration data for other systems for any significant length of time. Instead, such information is only retained to the extent necessary to assure provision of this information to the interfaces (102).

Figure 3A:
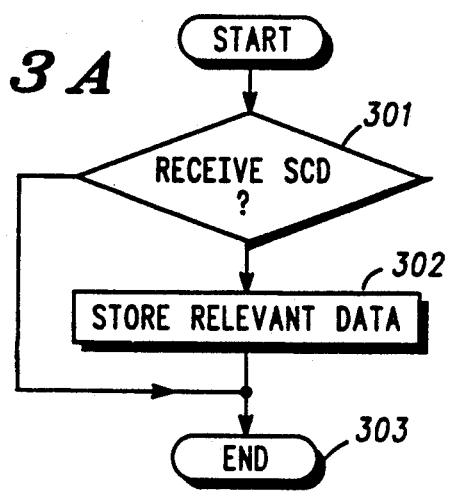
FIGS. 3A, B and C comprise flow diagrams depicting various operating modes of an interface in accordance with the invention.

Referring now to FIGS. 3A and B, operation of the interfaces (102) will be described.

Upon receiving system configuration data (301) from the system data manager (106) as indicated above, the interface (102) proceeds to store in its memory (103) relevant elements of that data (302). For example, if the new system configuration data for a particular communication system includes configuration information for a particular audio source that is relevant to the assigned activities of a particular interface (102), then that configuration information would be stored in the memory for that particular interface. Following storage of the relevant data (302), the process concludes (303).

Figure 3B:
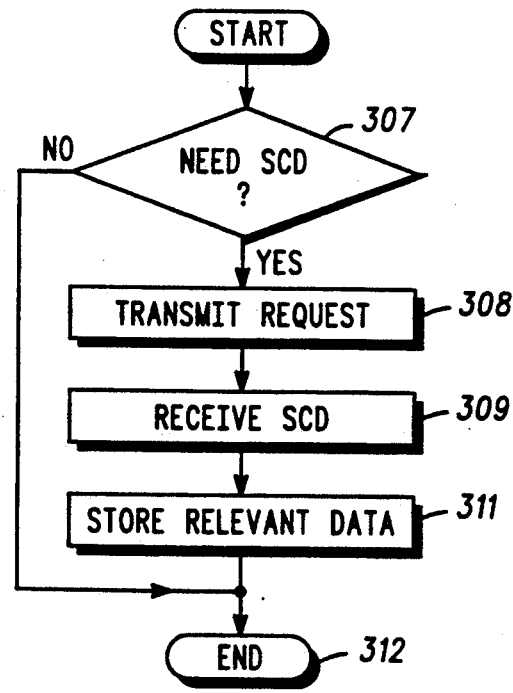

As depicted in FIG. 3B, an interface (102) may, from time to time, and for a variety of reasons, require updated system configuration data from a particular system. Though such needs will likely occur only infrequently, in this embodiment the interface (102) is provided with the capability of obtaining the necessary information in a relatively direct manner. Upon ascertaining that such a need exists (307), the interface (102) transmits an appropriate request (308) via the data link to a target communication system. The interface (102) that initiated the request will then receive a subsequent transmission of the requested system configuration data (309). The interface (102) can then again store relevant elements of that received data (311) and conclude this activity (312).

Figure 3C:
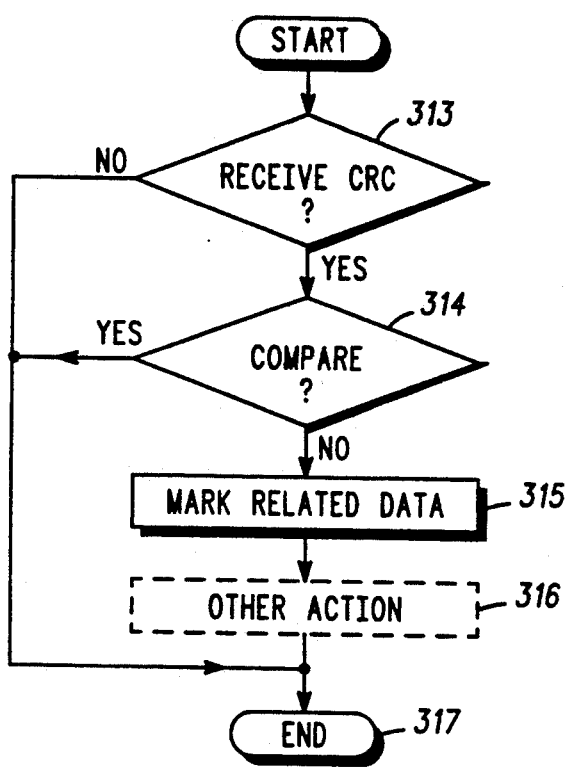

As noted above, when the system data manager (106) receives a CRC from another system, the system data manager (106) forwards that CRC information to its corresponding interface (102). With reference to FIG. 3C, upon receiving such a CRC (313), the interface compares that CRC against an appropriate stored CRC for that system (314). If the comparison is favorable, again indicating that the currently stored data likely corresponds to the current data, the process concludes (317). If the comparison indicates that the CRCs do not correspond, however, the interface will mark the corresponding stored system configuration data as being questionable (315). Thereafter, if desired, the interface can take other action appropriate (316). For example, the interface can prepare itself to receive updated system configuration data, since the system data manager also likely preceived the CRC issue, and therefore likely transmitted a request for updated information, all as described above. Or, if new information is not forthcoming within a particular period of time, the interface could begin its own attempts to obtain the information, also as described above.

So configured, system configuration data can be obtained, maintained, and provided as necessary without posing an undue need for memory and without presenting a significant burden to the data link.

What is claimed is:

1. A communication system comprising:
A) a plurality of audio source and destination consoles;
B) a data communication link;
C) a plurality of interfaces, wherein each console couples to a unique one of the interfaces, and each of the interfaces couples to the data communication link, and further wherein each of the interfaces includes memory means for storing system configuration data regarding the communication system, and data content indicator information for other communication systems;
D) system data manager means coupled to the data communication link for storing:
system configuration data regarding the communication system; and
data content indicators for other communication systems; and
for determining a data content indicator for the communication system.

2. The communication system of claim 1, wherein the system data manager means further functions to communicate system configuration data regarding the communication system to the plurality of interfaces.

3. The communication system of claim 2, wherein the system data manager means communicates the system configuration data to the plurality of interfaces via the data communication link.

4. The communication system of claim 1, wherein the system data manager means further functions to receive system configuration data regarding other communication systems, and to communicate that data to the plurality of interfaces.

5. The communication system of claim 4 wherein the system data manager means communicates the system configuration data regarding other communication systems to the plurality of interfaces via the data communication link.

6. The communication system of claim 1, wherein the system data manager means further functions to receive, data content indicators from other communication systems, and to compare such received data content indicators with the stored data content indicators.

7. The communication system of claim 6, wherein the system data manager means further functions to transmit a request for system configuration data from the other communication systems when a received data content indicator does not have a predetermined relationship to a corresponding stored data content indicator.

8. The communication system of claim 1, wherein the system data manager means further functions to transmit, the data content indicator for the communication system to other communication systems.

9. The communication system of claim 8, wherein the system data manager means transmits the data content indicator for the communication system in response to a predetermined event.

10. The communication system of claim 1, wherein the interfaces include transmit means for transmitting requests for system configuration data to system data manager means of other communication systems, and receiver means for receiving responses to such requests.

11. The communication system of claim 1, wherein the system configuration data includes audio source and destination information.

12. The communication system of claim 1, wherein the data content indicators comprise cyclic redundancy checks.

13. The communication system of claim 1, wherein the memory means further stores system configuration information for at least some of the other communication systems.

14. The communication system of claim 13, wherein the system data manager means further functions to communicate at least some of the system configuration data of the other communication systems to the plurality of interfaces for storage in the memory means.

15. The communication system of claim 14, wherein the plurality of interfaces further include receiver means for receiving, at least some of the system configuration data of the other communication systems from system data manager means of the other communication systems.

16. In a communication system comprising:
a plurality of audio source and destination consoles;
a data communication link;
a plurality of interfaces, wherein each console couples to a unique one of the interfaces, and each of the interfaces couples to the data communication link, and further wherein each of the interfaces includes memory means for storing system configuration data regarding the communication system, and data content indicator information for other communication systems; and
system data manager means coupled to the data communication link for storing:
system configuration data regarding the communication system; and
data content indicators for other communication systems; and for determining a data content indicator for the communication system, a method comprising the steps of:
at the system data manager means:
A) transmitting the data content indicator for the communication system to the other communication systems;
B) receiving a request from at least one system data manager means of another communication system to transmit the system configuration data regarding the communication system;
C) transmitting the system configuration data regarding the communication system to the at least one system data manager means of another communication system.

17. The method of claim 16, and further including the steps of:
at the system data manager means:
D) receiving a data content indicator for a different communication system;
E) comparing the received data content indicator for the different communication system with a stored data content indicator for that different communication system;

F) when the received data content indicator has a predetermined relationship with respect to the stored data content indicator, transmitting a request for the different communication system to transmit system configuration data for the different communication system;

G) receiving the system configuration data for the different communication system.

18. The method of claim 17, and further including the step of:

at the system data manager means:

H) communicating the system configuration data for the different communication system to the plurality of interfaces.

19. The method of claim 18, and further including the step of:

at the plurality of interfaces:

I) storing at least some system configuration data for the different communication system in the memory means.

* * * * *